United States Patent
Park et al.

(10) Patent No.: US 7,395,623 B2
(45) Date of Patent: Jul. 8, 2008

(54) CARD HOLDER FOR AN ANIMAL CAGE

(75) Inventors: Chinsoo Park, Salisbury, MD (US);
Lynn Irwin, Seaford, DE (US); Rodney Gerringer, Belcamp, MD (US); Dale Murray, Elkton, MD (US); John Huss, Jarrettsville, MD (US); Neil Campbell, Eden, MD (US)

(73) Assignee: Lab Products, Inc., Seaford, DE (US)

( * ) Notice: Subject to any disclaimer, the term of this patent is extended or adjusted under 35 U.S.C. 154(b) by 403 days.

(21) Appl. No.: 10/684,201

(22) Filed: Oct. 10, 2003

(65) Prior Publication Data

US 2004/0226206 A1    Nov. 18, 2004

Related U.S. Application Data

(60) Provisional application No. 60/421,368, filed on Oct. 25, 2002.

(51) Int. Cl.
*G09F 3/00*    (2006.01)

(52) U.S. Cl. .............................. 40/312; 40/308; 40/651

(58) Field of Classification Search .................. 40/308, 40/312, 651; 119/452, 467, 470
See application file for complete search history.

(56) References Cited

U.S. PATENT DOCUMENTS

| | | | | |
|---|---|---|---|---|
| 1,729,249 A * | 9/1929 | Egan | ............................ | 40/651 |
| 3,029,537 A * | 4/1962 | Hopp et al. | .................... | 40/653 |
| 3,287,841 A * | 11/1966 | Spragg et al. | ................. | 40/308 |
| 4,690,100 A * | 9/1987 | Thomas | ....................... | 119/419 |
| 4,993,177 A * | 2/1991 | Hudson | ........................ | 40/725 |
| 5,129,614 A * | 7/1992 | Kohl | ........................ | 248/309.2 |
| 5,212,899 A * | 5/1993 | Fandreyer | ................ | 40/661.11 |
| 5,526,598 A * | 6/1996 | Watanabe | ..................... | 40/308 |
| 6,073,378 A * | 6/2000 | Gabbert | ........................ | 40/661 |
| 2003/0056733 A1 * | 3/2003 | Niki | ............................ | 119/479 |

* cited by examiner

*Primary Examiner*—Cassandra Davis
(74) *Attorney, Agent, or Firm*—Stroock & Stroock & Lavan, LLP

(57) ABSTRACT

An embodiment of a card holder system for retaining a card with an animal cage can comprise a card holder designed and dimensioned to selectively retain the card, and a retention member adapted for retaining the card holder to the cage. The retention member is adapted to be secured to a side wall of the cage. In certain embodiments, the card holder can be selectively retained in one of a horizontal orientation and a vertical orientation. The card holder system can further comprise an adapter member, the adapter member being designed and dimensioned to be coupled with the card holder such that the card holder may be selectively positioned in one of a first orientation and a second orientation, the second orientation being substantially rotated ninety-degrees from the first position.

25 Claims, 19 Drawing Sheets

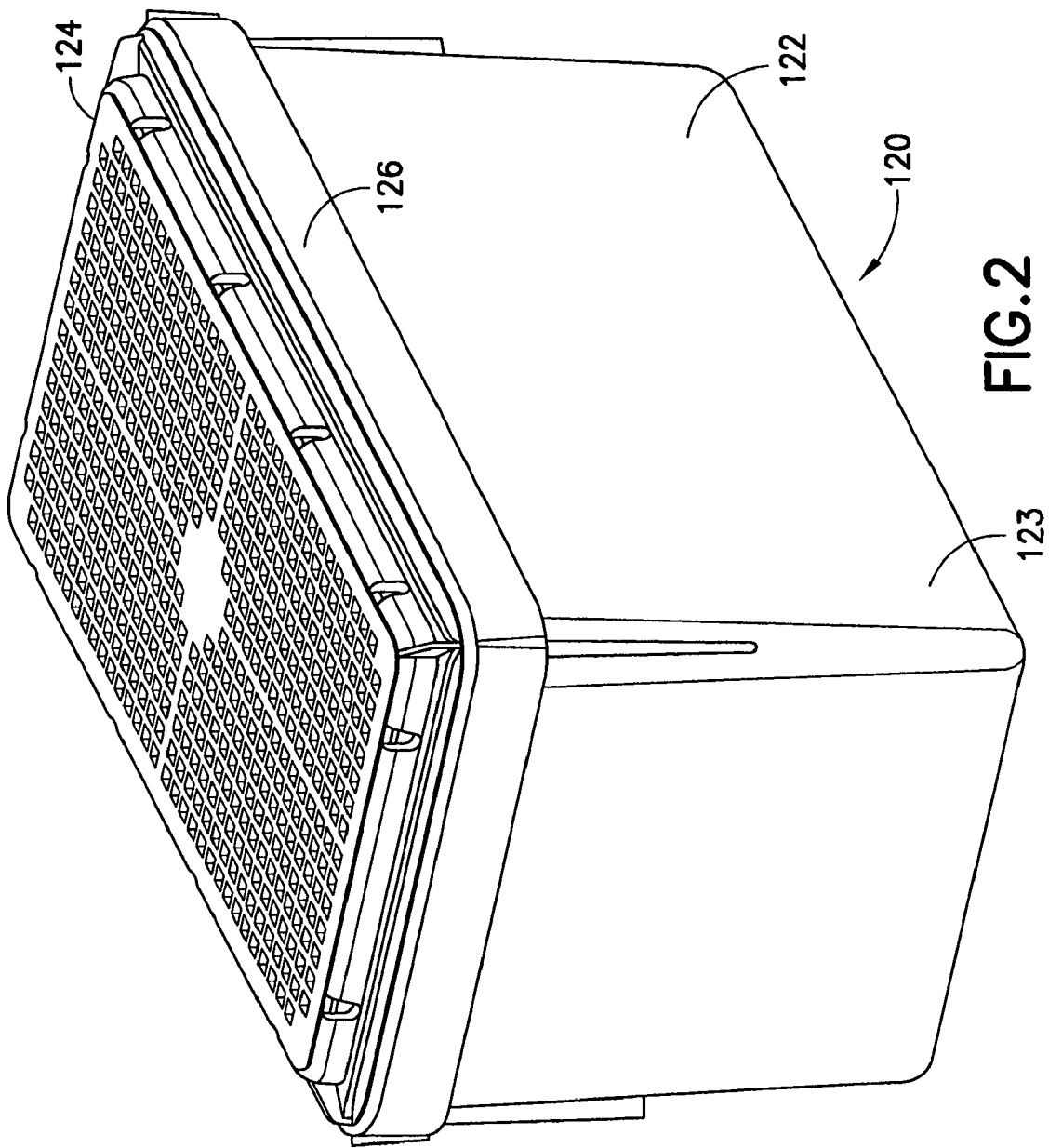

CARD HOLDER FOR AN ANIMAL CAGE

CROSS-REFERENCE TO RELATED APPLICATION

This application claims the benefit of U.S. Provisional Patent Application No. 60/421,368, filed Oct. 25, 2002, entitled "Card Holder for Animal Cage," which is incorporated by reference herein.

BACKGROUND OF THE INVENTION

1. Field of the Invention

The invention relates generally to cage and rack systems for housing animals, and more particularly to card holders for cage and rack systems. xxx 2. Description of Related Art It is well known in the art to house laboratory animals, such as mice and rats, in cages. It is also well known to place the cages on racks. These cages are typically ventilated and, when placed in a rack, environmentally controlled by a fan system of the rack.

It is also known to associate with cages index cards and/or other pieces of paper on which to record and keep track of experimental data throughout a study much in the same way that patients have their medical status recorded on a bedside chart when at a hospital. Typical recorded information includes the animal source, animal specifications, investigator, special diet restrictions, medications to be administered, and types of food to be provided.

Card holders for holding these cards with their respective cages are known in the art. These related card holders are satisfactory. However, because the card holders are typically formed from metal, they are typically heavy, cumbersome to use, expensive to manufacture and often comprise several complex mechanical parts. Additionally, related card holders, being made of metal, are typically opaque, and consequently do not afford favorable views into the cage when the card holder is positioned in front of the cage. Furthermore, related card holders typically are fastened to the cage unit by a spring clip that clips onto the filter top or lid of the cage. Because the lids are often removed from the cages to clean the cages, feed the animals, or provide other types of necessary maintenance, the card holders along with their cards and experimental information, are prone to getting lost, misplaced or mixed-up and replaced on an incorrect cage. Other card holders are designed such that they are to be placed in a special receptacle formed as part of the cage. Accordingly, that type of card holder is only meant to be used with a specific matching cage design; retrofitting such a card holder to other types of cages is difficult, and often not possible. As such, a need exists for an improved card holder for cage and rack systems for housing animals.

SUMMARY OF THE INVENTION

The invention satisfies these and other needs. The invention is directed to an improved card holder and retention member system for retaining information cards on animal cages housed in rack systems. The card holder can be formed of a clear or transparent plastic, thus being light weight, relatively inexpensive to manufacture, and facilitating favorable views of animals within the cage.

An embodiment of a card holder system for retaining a card with an animal cage can comprise a card holder designed and dimensioned to selectively retain the card, and a retention member adapted for retaining the card holder to the cage. The retention member is adapted to be secured to a side wall of the cage. In certain embodiments, the card holder can be selectively retained in one of a horizontal orientation and a vertical orientation. The card holder system can further comprise an adapter member, the adapter member being designed and dimensioned to be coupled with the card holder such that the card holder may be selectively positioned in one of a first orientation and a second orientation, the second orientation being substantially rotated ninety-degrees from the first position.

Embodiments of the invention may provide for a card holder that is retained on the cage body, thus providing for better retention of the card and its attendant experimental information with the proper cage when the lid of the cage is removed for cleaning, feeding or other purposes. The card holder system can be retrofit onto many types, sizes and shapes of cages. By way of an adapter member coupled with the card holder, the card holder may be selectively positioned in one of a first orientation and a second orientation, the second orientation being substantially rotated ninety-degrees from the first position. By orienting the card in a narrow width-wise orientation (three-inch part on top, five-inch part on the side), more viewing space into the cage may be available as less of the width of the side of the cage is obscured by the card holder.

The present invention accordingly comprises the features of construction, combination of elements, and arrangement of parts, which will be exemplified in the disclosure herein, and the scope of the present invention will be indicated in the claims.

BRIEF DESCRIPTION OF THE DRAWING FIGURES

In the drawing figures, and which are merely illustrative, and wherein like reference numerals depict like elements throughout the several views:

FIG. 2 is a perspective view of a cage as would be used with the invention;

DETAILED DESCRIPTION OF EXEMPLARY EMBODIMENTS

An embodiment of the invention is directed to a card holder that is light weight, relatively inexpensive to manufacture, has relative mechanical simplicity, and may be transparent or translucent thus affording improved views of housed animals. Additionally, embodiments of the invention may facilitate orienting the card holder in a substantially horizontal orientation (i.e., extending outward perpendicularly from the side of the cage) such that an animal within the cage may be viewed even when a card is in card holder. Furthermore, the card holder is not likely to be accidentally misplaced during maintenance and moving of the filter top because it is retained by a retention member on the cage (which is not affected by removal of the filter top), and not prone to being lost during maintenance and moving of the filter top of the cage.

Figure 1:
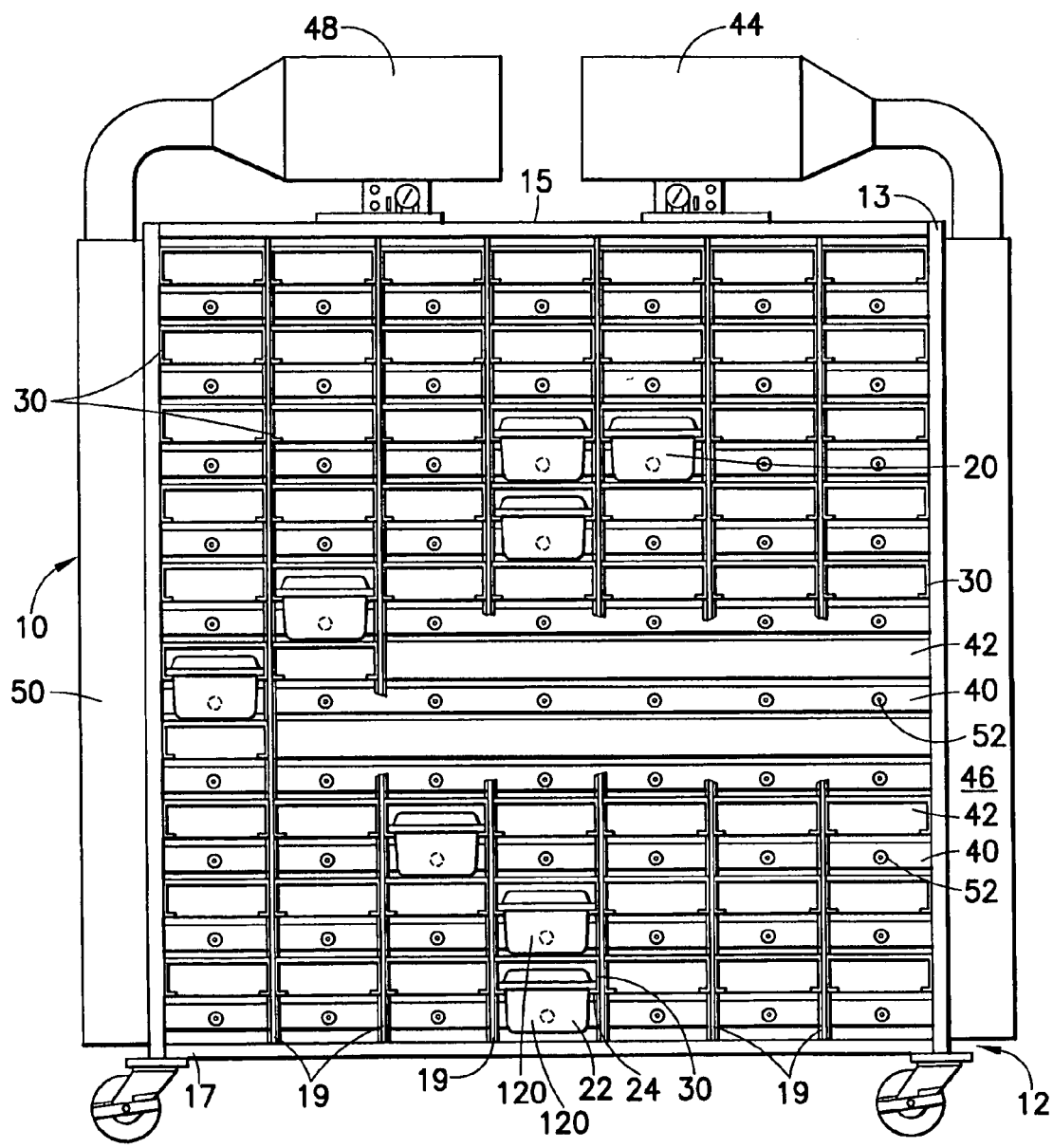
FIG. 1 is a front elevational view, with partial cutaway, of a ventilated cage and rack system as would be used with the invention.

Reference is first made to FIG. 1, wherein a ventilated cage and rack system, as could be used in conjunction with the present invention, generally indicated at 10, is shown. Ventilated cage and rack system 10 includes an open rack 12 having a left side wall 11 and a right side wall 13, a top 15, and a bottom 17. A plurality of posts 19 is disposed in parallel between top 15 and bottom 17. Vertical posts 19 are preferably narrow and may comprise walls extending substantially from the front of rack 12 to the rear of rack 12, or may each comprise two vertical members, one at or near the front of rack 12 and the other at or near the rear of rack 12.

Ventilated cage and rack system 10 also includes a plurality of air supply plena 40 and air exhaust plena 42 alternately disposed in parallel between left side wall 11 and right side wall 13 substantially in the rear of rack 12. Air is forced into air supply plena 40 by a blower 44 through an air supply conduit 46, the air supply conduit 46 communicating with each air supply plenum 40 through a side wall of the rack 12. A plurality of cage level barrier cages 120 are typically positioned within rack 12.

Reference is now made to FIG. 2, in which an embodiment of the cage 120, as could be used in conjunction with the present invention, is shown. Each cage 120 is formed of a gas impermeable bottom portion 122 having an upstanding side wall 123 and a filter top 124. The filter top 124 may have an overhang 126 which extends over the top and of bottom portion 122. The filter top 124 is selectively removable from bottom portion 122 to facilitate the placement of animals into cage 120, the removal of animals out of cage 120 or cleaning or providing food for the animals. Bottom portion 122 is preferably formed of a transparent of translucent plastic such that the activities of an animal within cage 122 may be observed by a technician when cage 120 is placed in rack 12.

Figure 3A:
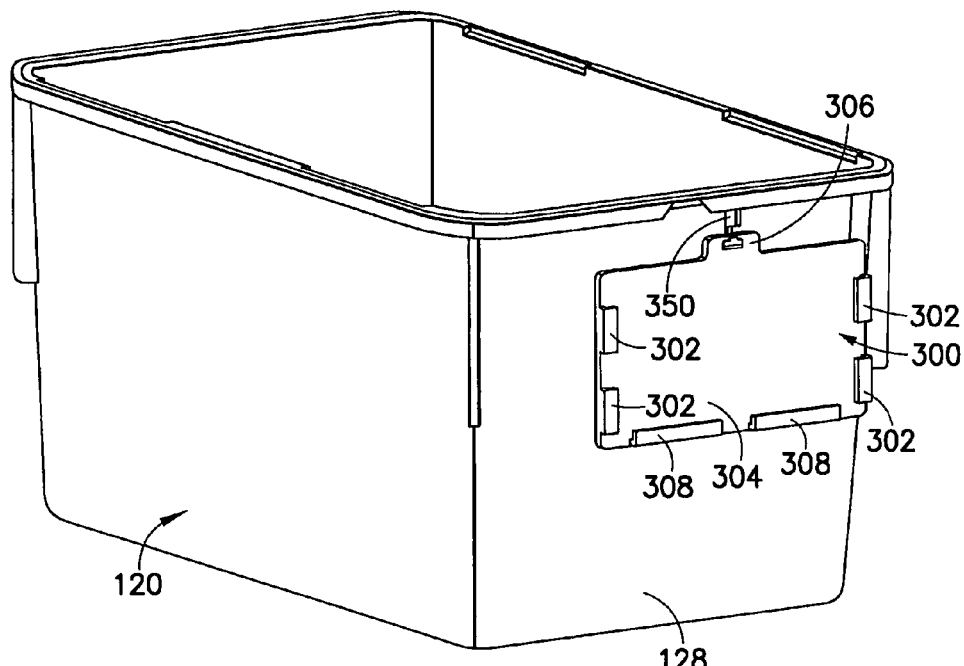
FIG. 3A is perspective view of a cage, card holder, and retention member constructed in accordance with an embodiment of the invention.
Figure 3B:
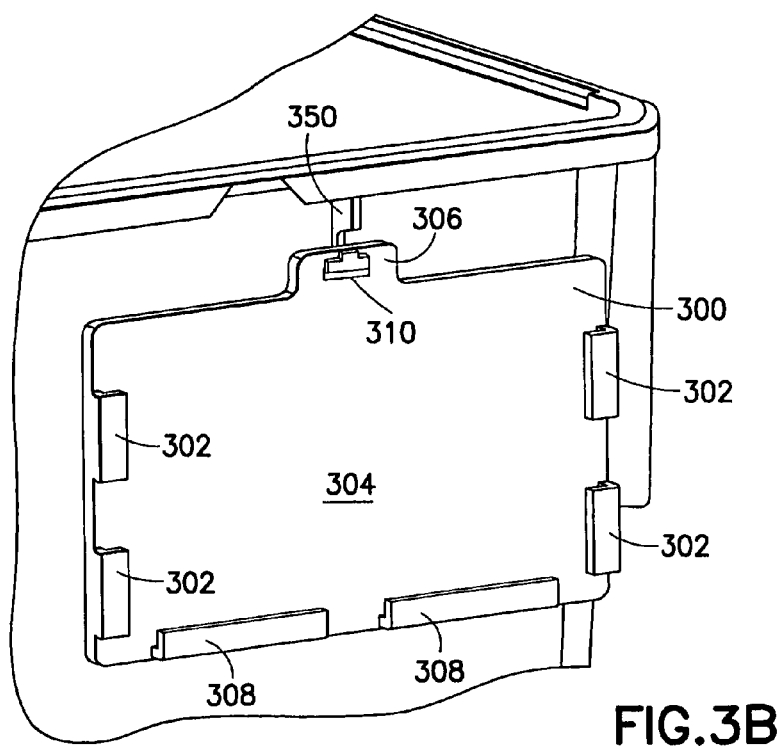
FIG. 3B is an enlarged perspective view of the card holder and retention member of FIG. 3A.

Turning to FIGS. 3A and 3B, there is shown a cage 120 having a card holder 300 retained thereon by retention member 350. Retention member 350 may be secured to the front of viewing wall 128 of cage 120 by way of an adhesive, a screw and nut, or some combination of the two, or other securing means as are known by those skilled in the art. In another embodiment of the invention, retention member 350 may be formed as an integral part of front wall 128 of cage 120. Card holder 300 has a substantially rectangular (although other shapes can be used) backplate 304. In a preferred embodiment, backplate 304 is dimensioned to be just slightly larger than a three-inch by five-inch index card. In other embodiments of the invention, backplate 304 can be dimensioned larger or smaller in accordance with the type of card or writing material that is to be placed within card holder 300. In some embodiments, the size of cage 120 may dictate the size of backplate 304. In other embodiments, however, all card holders 300 can have the same dimension backplate regardless of the size of cage 120.

Side guides 302 have a portion extending away from backplate 304 and another portion extending over and substantially parallel to backplate 304 such that side guides 302 are formed substantially in the shape of an L. In an embodiment of the invention, two side guides extend from each of the left and right sides of backplate 304. Side guides 304 serve to align and position an index card (not shown) as it is placed and secured in card holder 300. In a preferred embodiment, side guides 302 are spaced apart on each side of backplate 304 such that an index card tends not to be angled such that a corner of the index card protrudes out from the recess between the two side guides 302 during insertion of the index card. In another embodiment of the invention, fewer or more side guides 302 may be used as a matter of application specific design choice as would be determined by one skilled in the art, as instructed by the present disclosure. Bottom guides 308, like side guides 302, extend from the bottom edge of backplate 304 and are shaped and dimensioned in a similar fashion to that of side guides 302. Bottom guides 308 also facilitate insertion of an index card and securing of an index card once placed in card holder 300.

Figure 4:
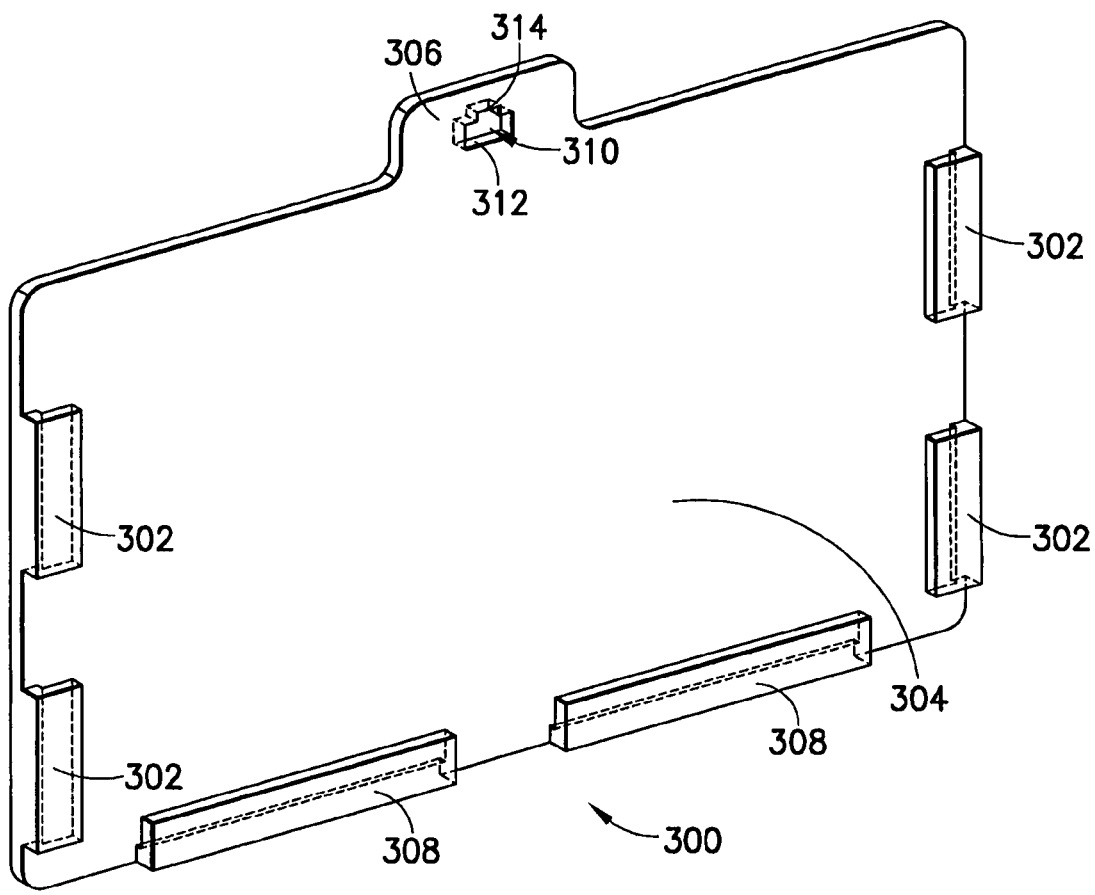
FIG. 4 is an enlarged perspective view of the card holder of FIG. 3A.

Referring specifically to FIG. 3B, a securing portion 306 extends upward from the top edge of backplate 304. An aperture 310 is defined in securing portion 306 such that card holder 300 may be retained on retention portion 350. Turning to FIG. 4, card holder 300 is shown in greater detail. Specifically, aperture 310 defined in securing portion 306 has a lower portion 312 and an upper portion 314. In an embodiment of the invention, both lower portion 312 and upper portion 314 of aperture 310 may be defined as substantially rectangular in shape, with lower portion 312 being wider than upper portion 314.

Figure 5:
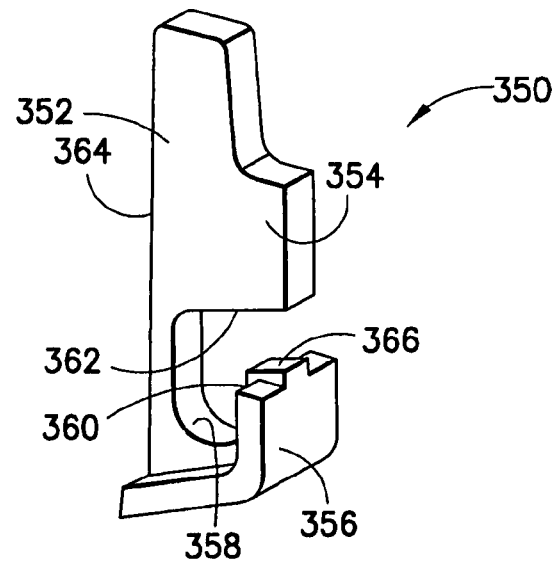
FIG. 5 is an enlarged perspective view of the retention member of FIG. 3A.

Now turning to FIG. 5, there is shown an embodiment of retention member 350 in greater detail. As discussed above, retention member 350 may be secured to front face 128 of cage 120 by placing an adhesive on mounting face 364 of face 352 of retention member 350. In an embodiment, mounting face 364 is substantially flat such that a flush contact may be made between front face 128 of cage 120 and the mounting face 364. In other embodiments, as discussed above, screws and nuts and/or the other mounting means may be used to secure retention member 350 to cage 120. In certain embodiments, a tongue and groove system may be advantageously formed on front face 128 of cage 120 and mounting face 364 of retention member 350.

Figure 6:
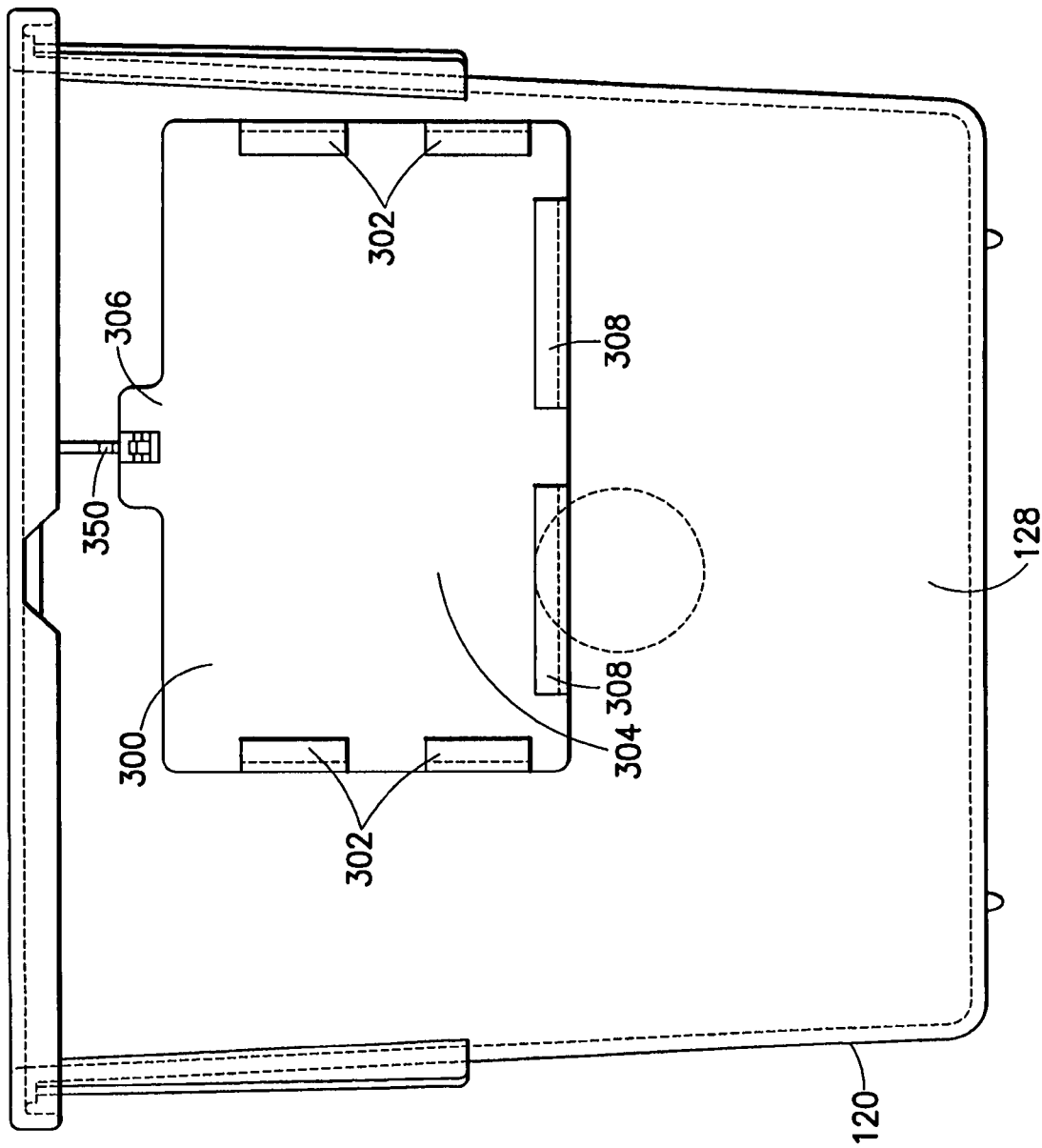
FIG. 6 is a front elevational view of an embodiment of the cage, card holder and retention member in accordance with the invention.
Figure 7:
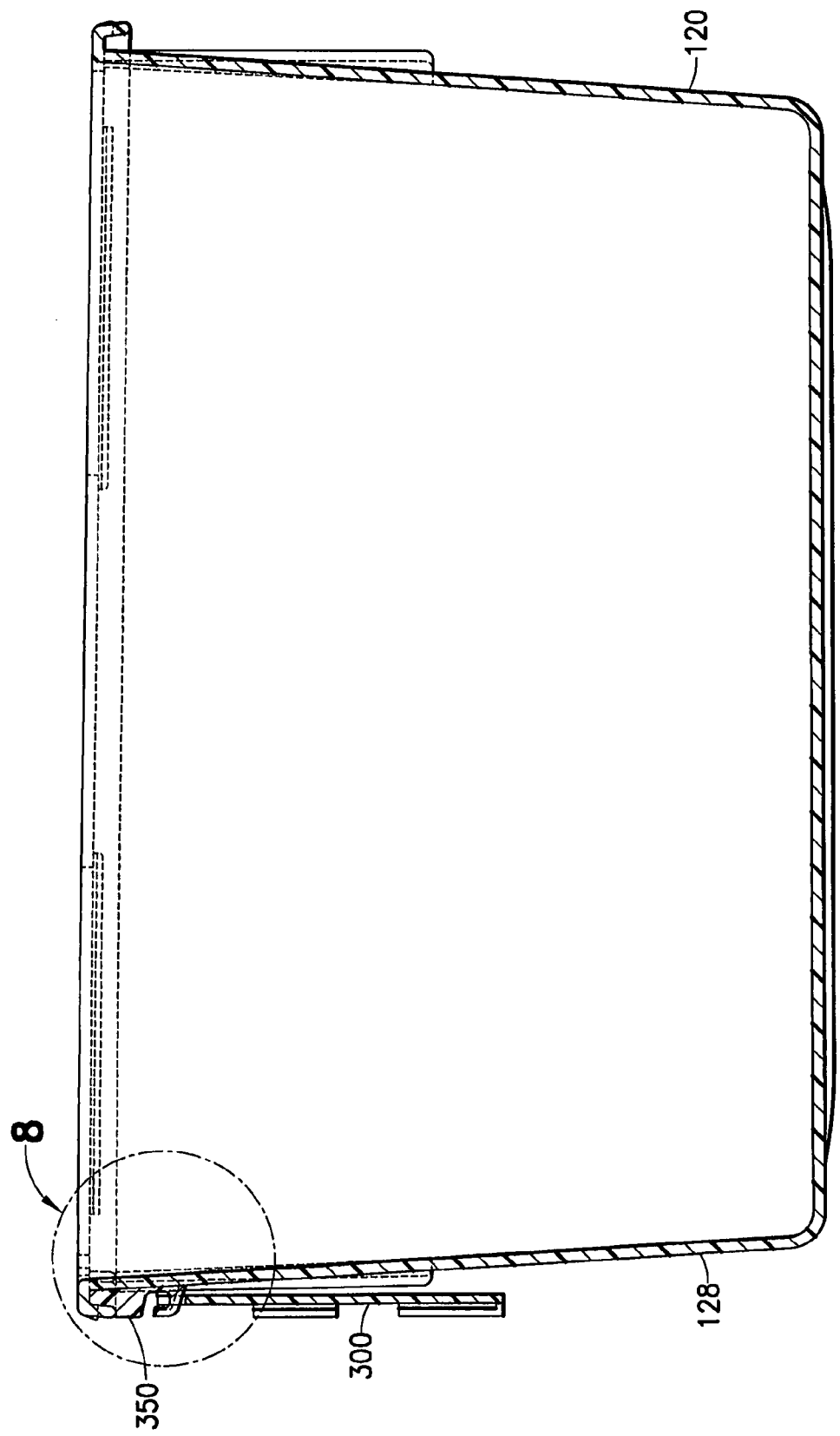
FIG. 7 is a side elevational view of the cage, card holder and retention member of FIG. 6.

An extension portion 354 is formed on base 352, and overhangs curved portion 358 of hook portion 356. An abutment wall 362 is aligned substantially horizontally and serves to facilitate retention of card holder 300 on retention member 350. Specifically, when securing portion 306 with aperture 310 is placed over hook portion 356 such that card holder 300 hangs in a vertical alignment resting on curved portion 358 of retention member 350, any accidental bumping of card holder 300 will typically not cause card holder 300 to be inadvertently knocked off of retention member 350 as the top portion of securing portion 306 will contact abutment wall 362 and return to the resting position on curved portion 358. Turning to FIGS. 6 and 7, further views of card holder 300 being retained by retention member 350 on cage 120 are shown. Furthermore, a technician can typically write and make notations on the card more easily when the card holder is in the horizontal position.

Figure 8:
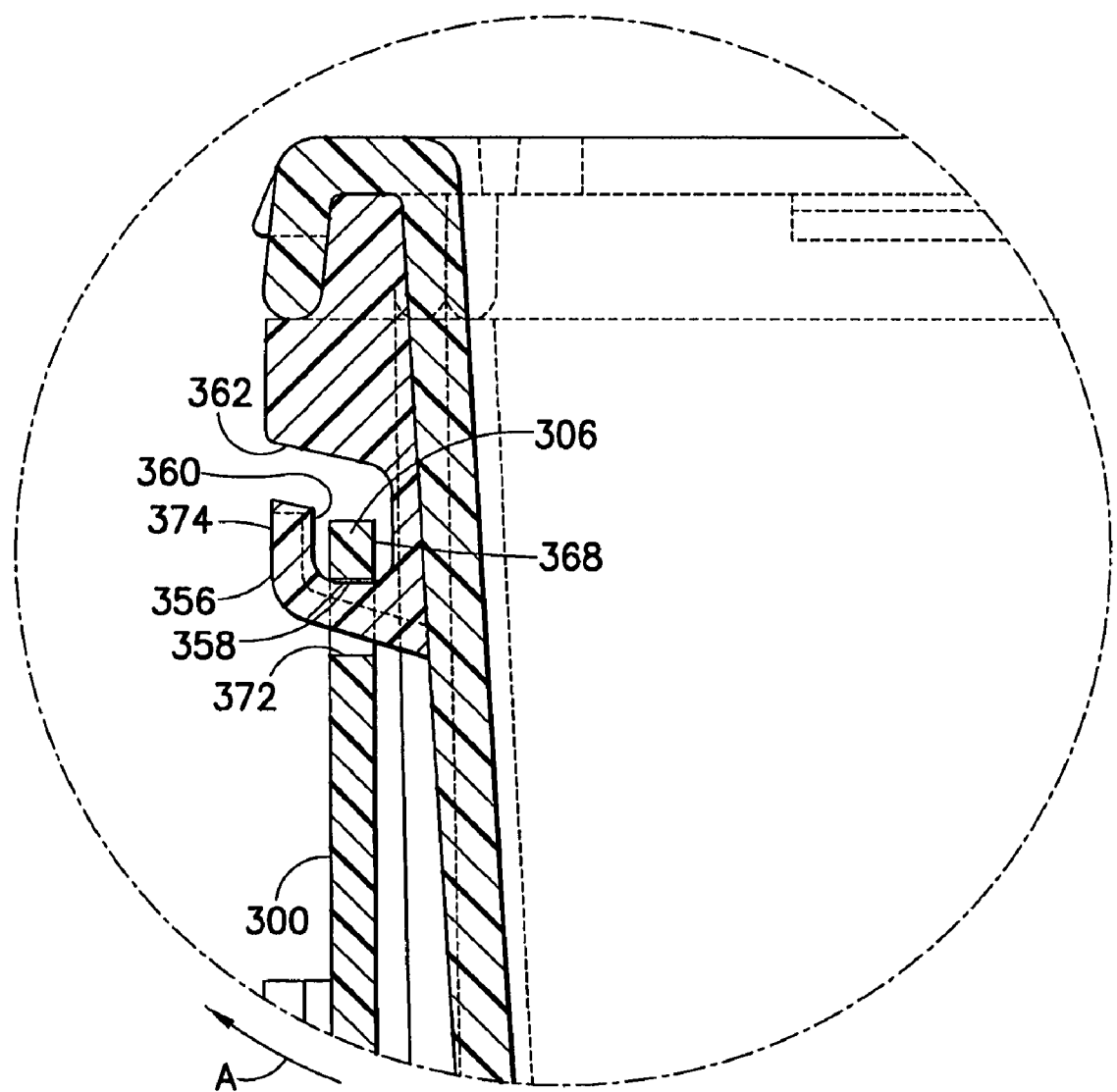
FIG. 8 is an enlarged view of section 8 of the cage, card holder and retention member of FIG. 7.

With reference to FIG. 8, there is shown card holder 300 being retained in a vertical position by retention member 350. As is illustrated, in certain embodiments, curved portion 358 is dimensioned such that when card holder 300 is moved or pivoted in the general direction A to lift card holder 300 into a horizontal orientation, flat surface 368 of securing portion 306 rests in curved portion 358 while lower surface 372 of aperture 310 rests against the front surface 374 of hook portion 356. Accordingly, the retention member and card holder 300 are designed and dimensioned such that card holder 300 may be retained in either a vertical or a horizontal orientation. The benefit of retaining card holder 300 in the horizontal position is that such an orientation facilitates viewing of animals within cage 120 by laboratory personnel which a card is disposed in the card holder.

Figure 9:
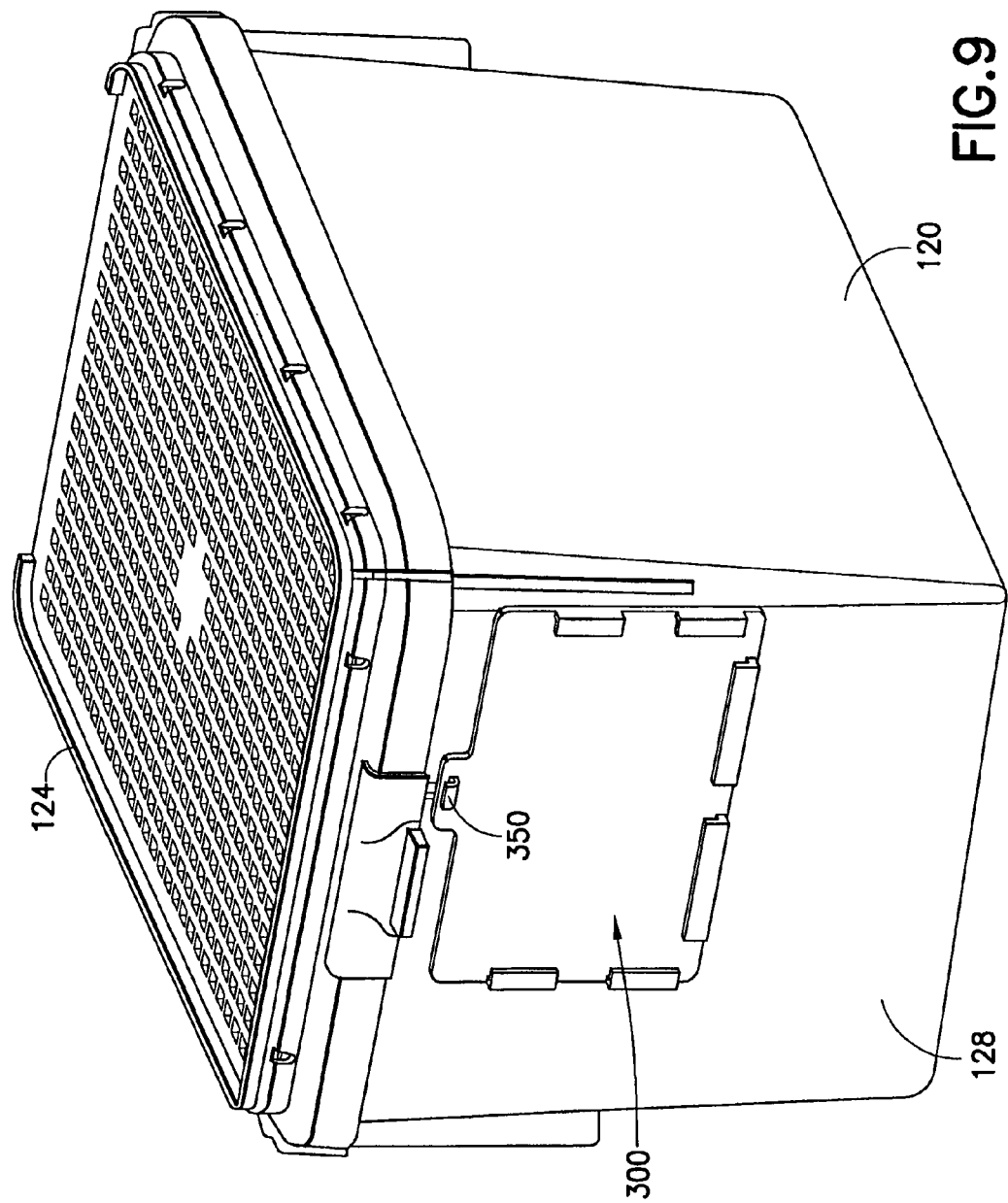
FIG. 9 is a perspective view of the cage, card holder and retention member, with the card holder being in a reading position.

Turning to FIG. 9, there is shown card holder 300 oriented in the vertical position and being retained by retention member 350. Card holder 300 is preferably formed of a clear or translucent plastic material. The benefits of this design choice are relatively low manufacturing costs, relatively low weight, relatively less mechanical complexity than prior art metal card holders, and, if no index card is positioned in card holder 300 (or if a card formed of transparent or translucent material is used), an observer may look through card holder 300 into cage 120.

Figure 10:
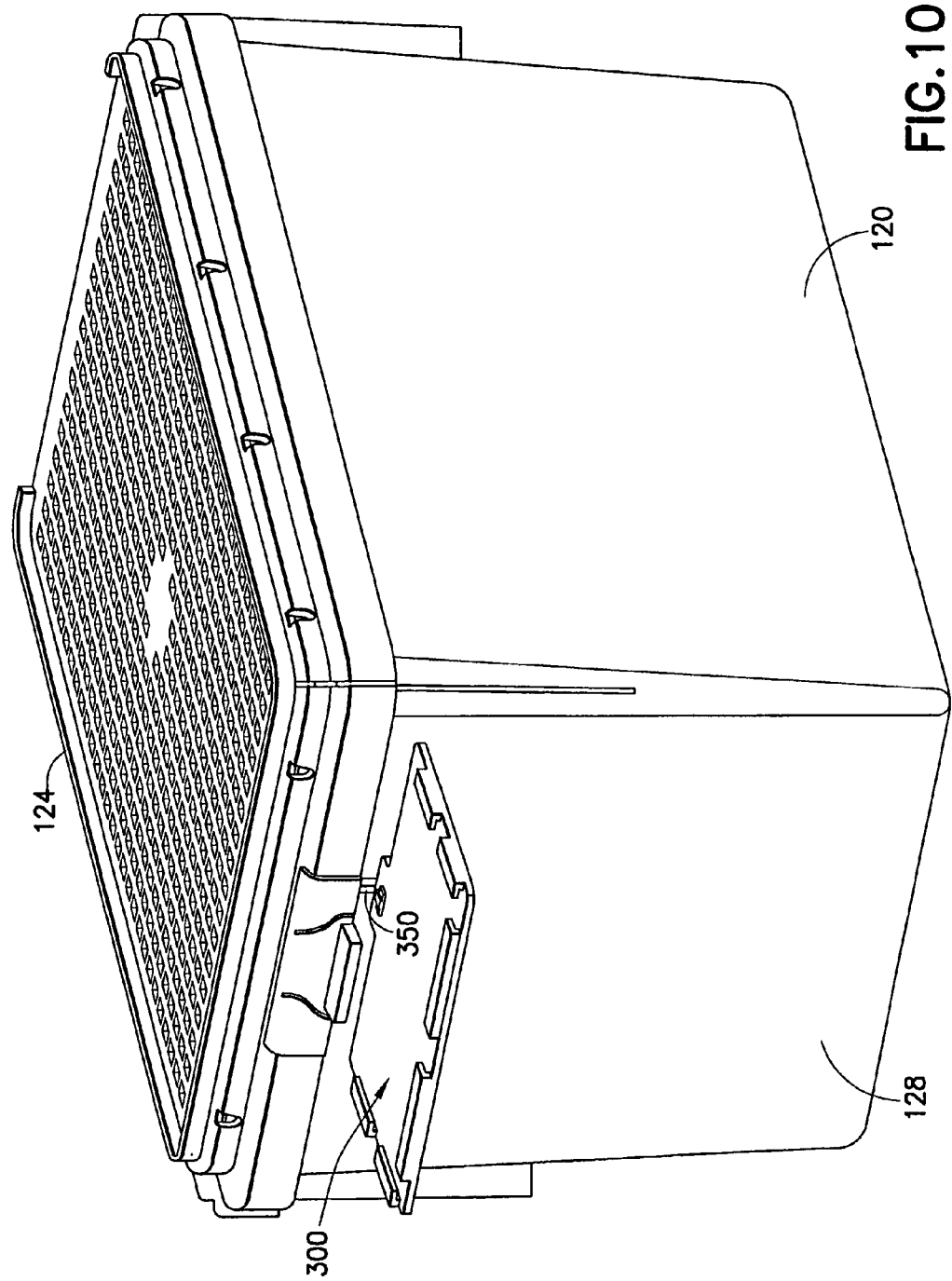
FIG. 10 is a perspective view of the cage, card holder and retention member of FIG. 9, with the card holder being in an animal viewing position.

As illustrated by FIG. 10, card holder 300 is in the horizontal orientation. As discussed above, this orientation allows an observer to view animals within the cage even if a card is positioned within the card holder 300.

Figure 11:
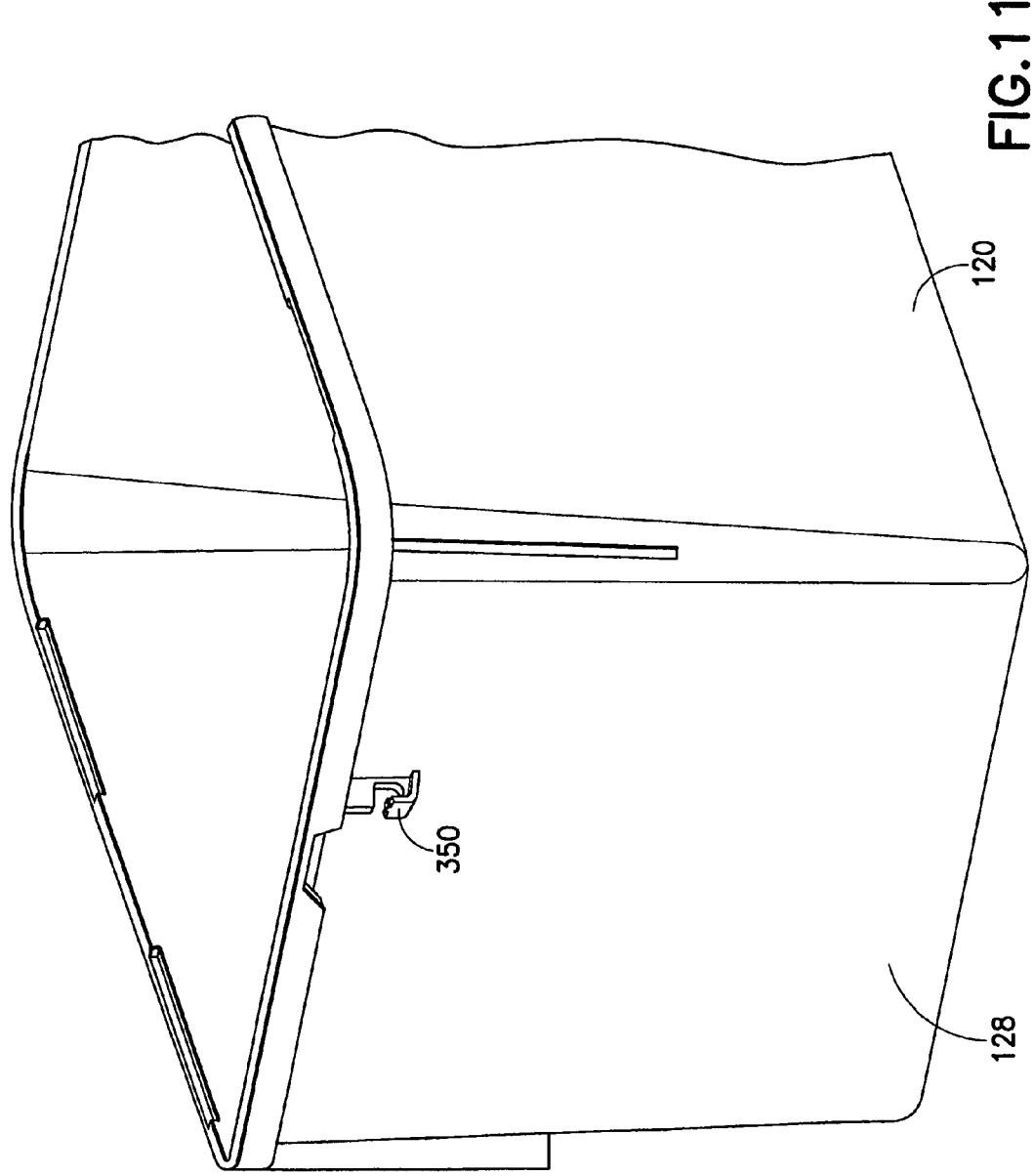
FIG. 11 is a perspective view of a cage and retention member, with the filter top removed from the cage.

Turning to FIG. 11, there is shown retention member 350 secured to front face 128 of cage 120. The filter top 124 is not shown, and has been removed as it would be for cage cleaning, feeding, or other operations necessitated by the care and maintenance of the laboratory animal environment. As can be seen, however, because retention member 350 is secured to cage 120 and not to filter top 124, card holder 300 is not removed away with filter top 124. Accordingly, a resulting benefit is that the card holder 300, the card and its pertinent card information remain with cage 120 when filter top 124 is removed, thus reducing the chance of confusion and loss if filter tops 124 are, for example, repositioned on the incorrect cage after cleaning. In accordance with the present invention, the pertinent animal information will remain with the proper cage.

Figure 12:
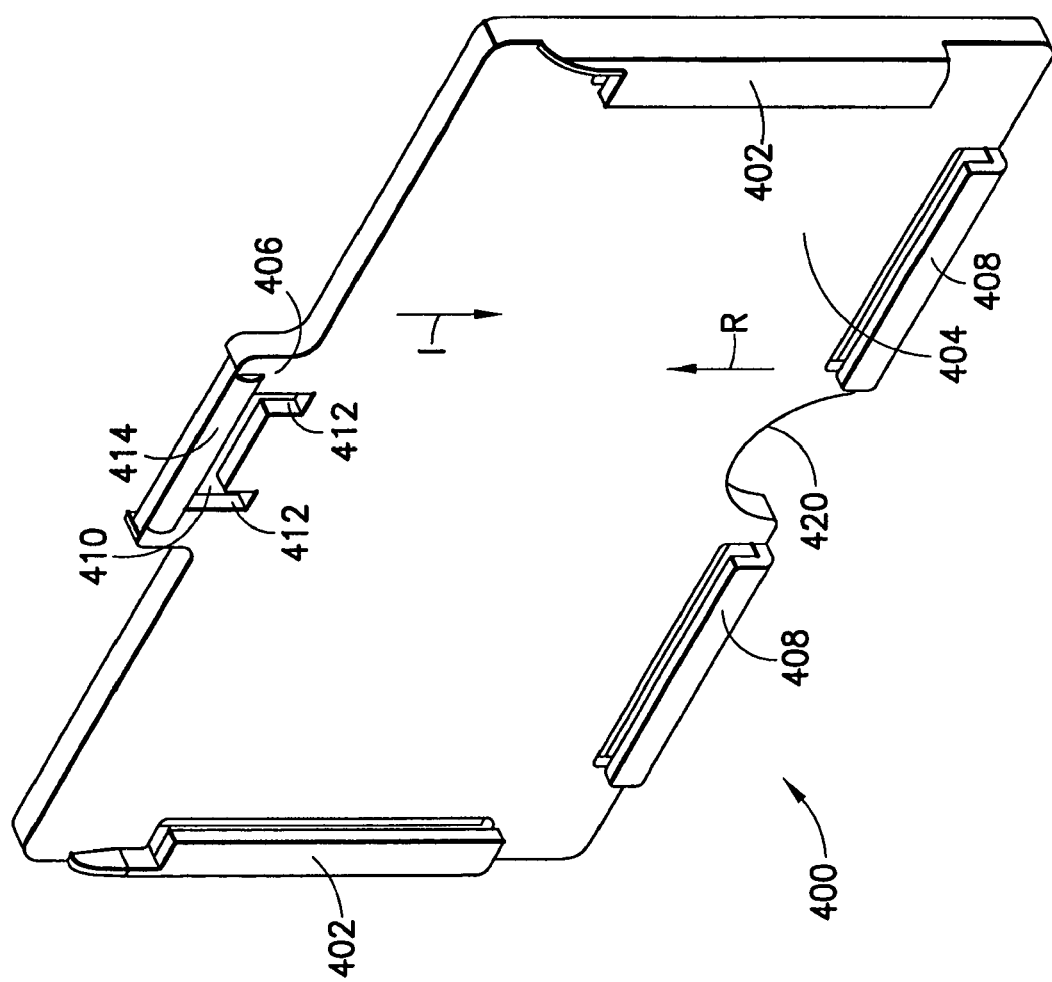
FIG. 12 is a perspective view of another embodiment of a card holder in accordance with the invention.
Figure 13:
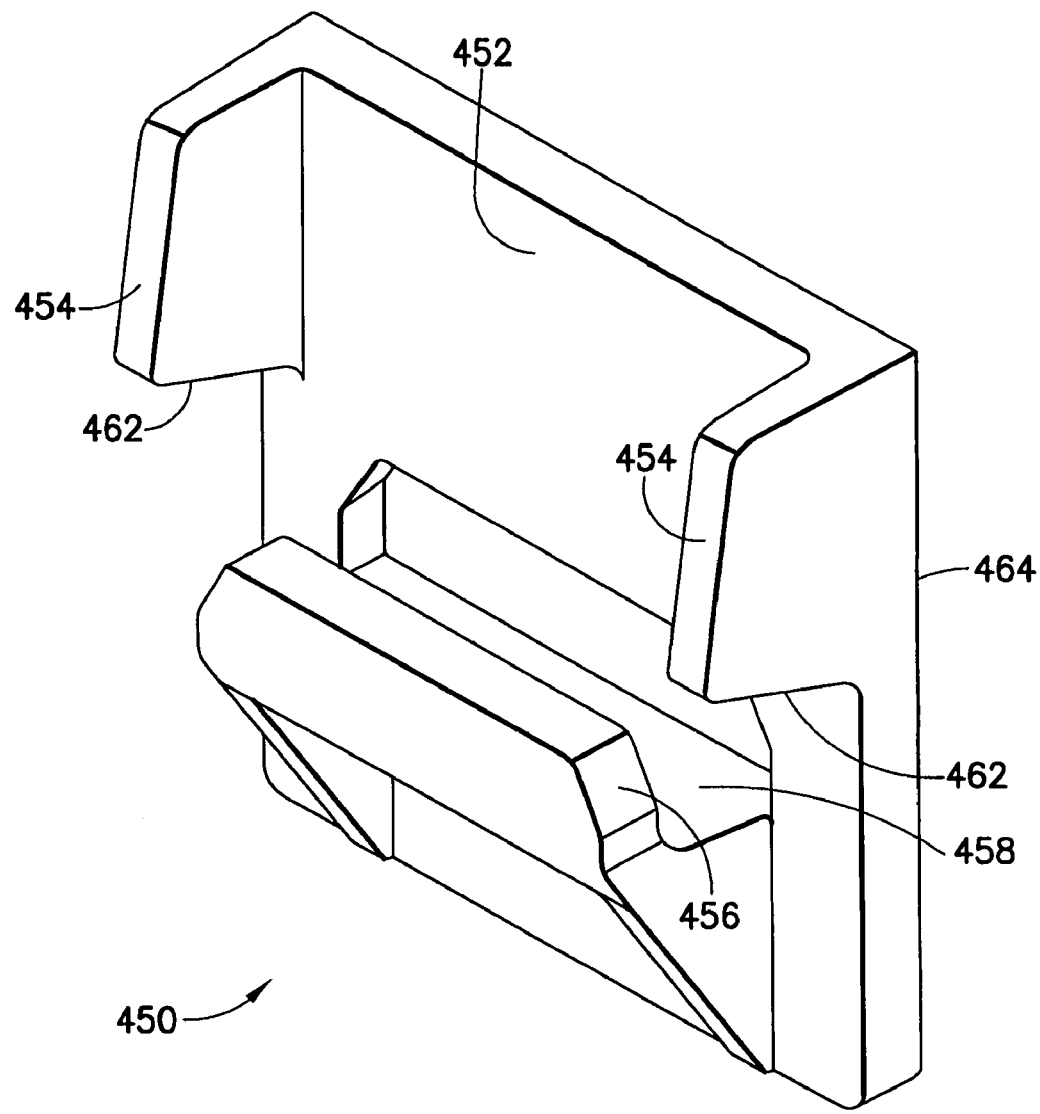
FIG. 13 is a perspective view of another embodiment of a retention member in accordance with the invention.

Another embodiment of a card holder 400 in accordance with the invention is illustrated in FIG. 12, and another embodiment of a retention member 450 is illustrated in FIG. 13. Card holder 400 has a substantially rectangular backplate 404. In a preferred embodiment, backplate 404 is dimensioned to be just slightly larger than a three-inch by five-inch index card (although the preferred size can be related to size of card or other indicator used). In other embodiments of the invention, backplate 404 can be dimensioned larger or smaller in accordance with the type of card or writing material that is to be placed within card holder 400.

Side guides 402 have a portion extending away from backplate 404 and another portion extending over and parallel to backplate 404 such that side guides 402 are formed substantially in the shape of an L. Side guides 404 serve to align and position an index card (not shown) as it is placed and secured in card holder 400. In other embodiments of the invention, fewer or more side guides 402 may be used as a matter of application specific design choice as would be determined by one skilled in the art, as instructed by the present disclosure. Bottom guides 408, like side guides 402, extend an edge of backplate 404 and are shaped and dimensioned in a similar fashion to that of side guides 402. Bottom guides 408 also facilitate insertion of an index card and securing of an index card once placed in card holder 400. In certain embodiments, a card removal recess 420 is defined in backplate 404. In use, a card is placed into card holder 400 in the general direction I. To facilitate removal of the card, in the general direction R, a user can press on the card, with recess 420 facilitating such movement.

A securing portion 406 extends upward from the top edge of backplate 404. An aperture 410 is defined in securing portion 406 such that card holder 400 may be retained on retention portion 450, in a manner similar to that discussed above with respect to card holder 300.

Now turning to FIG. 13, there is shown an embodiment of retention member 450. In this embodiment, mounting face 464 is substantially flat such that a flush contact may be made between front face 128 of cage 120 and the mounting face 464. In other embodiments, as discussed above, screws and nuts and/or the other mounting means may be used to secure retention member 450 to cage 120.

One or more extension portions 454 are formed on base 452, and overhang hook portion 456. An abutment wall 462 is aligned substantially horizontally and serves to facilitate retention of card holder 400 on retention member 450. In an embodiment, aperture 410 of card holder 400 is defined with access slots 412 therein (see FIG. 12). In use, when card holder 400 is placed on retention member 450, extension portions 454 of retention member 450 pass at least partially into access slots 412, facilitating placement of card holder 400 on retention member 450. In certain embodiments, card holder 400 also includes support strip 414 (see FIG. 12), which provides for added structural support.

Figure 14:
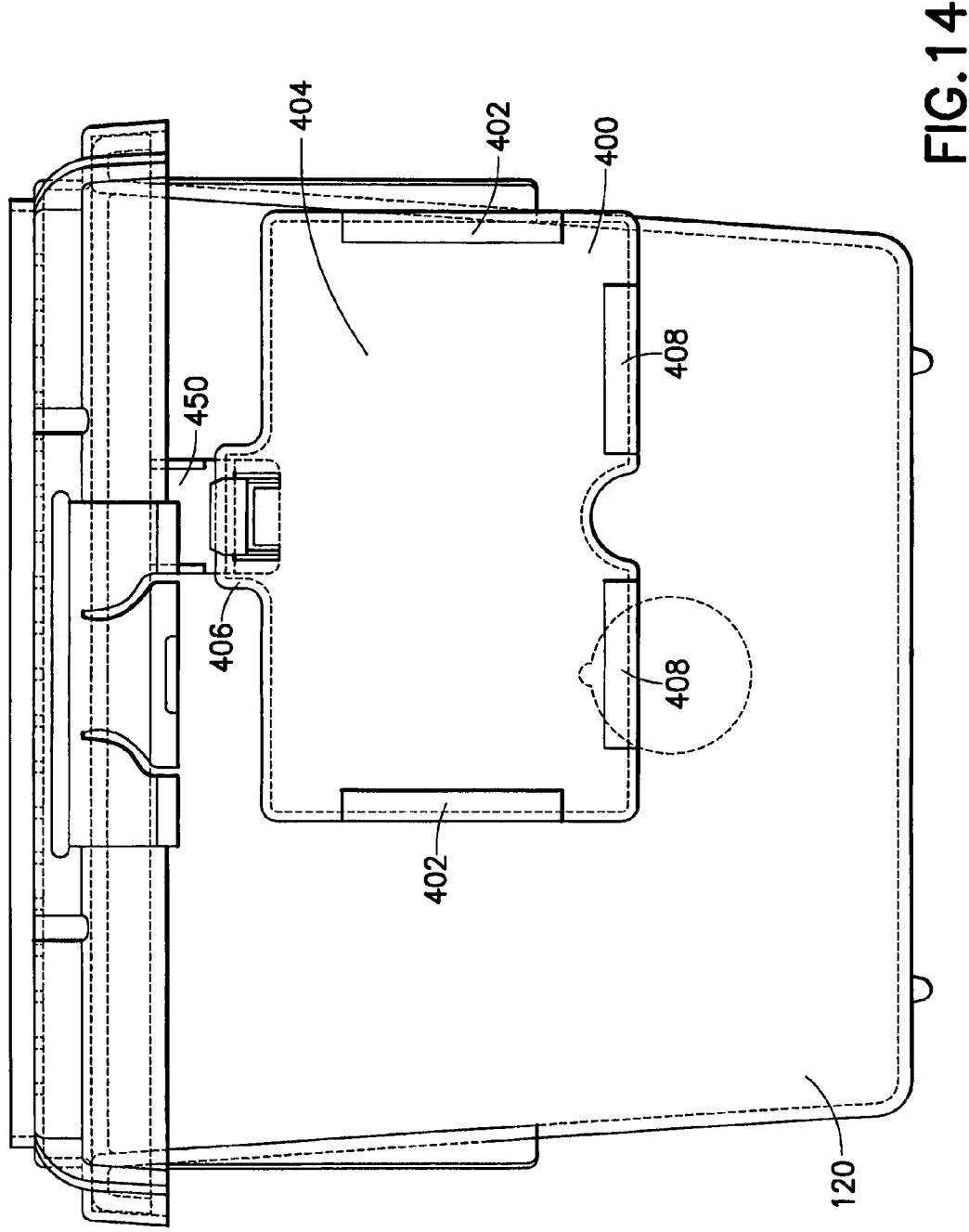
FIG. 14 is a front elevational view of an embodiment of the cage, card holder and retention member in accordance with the invention.
Figure 15:
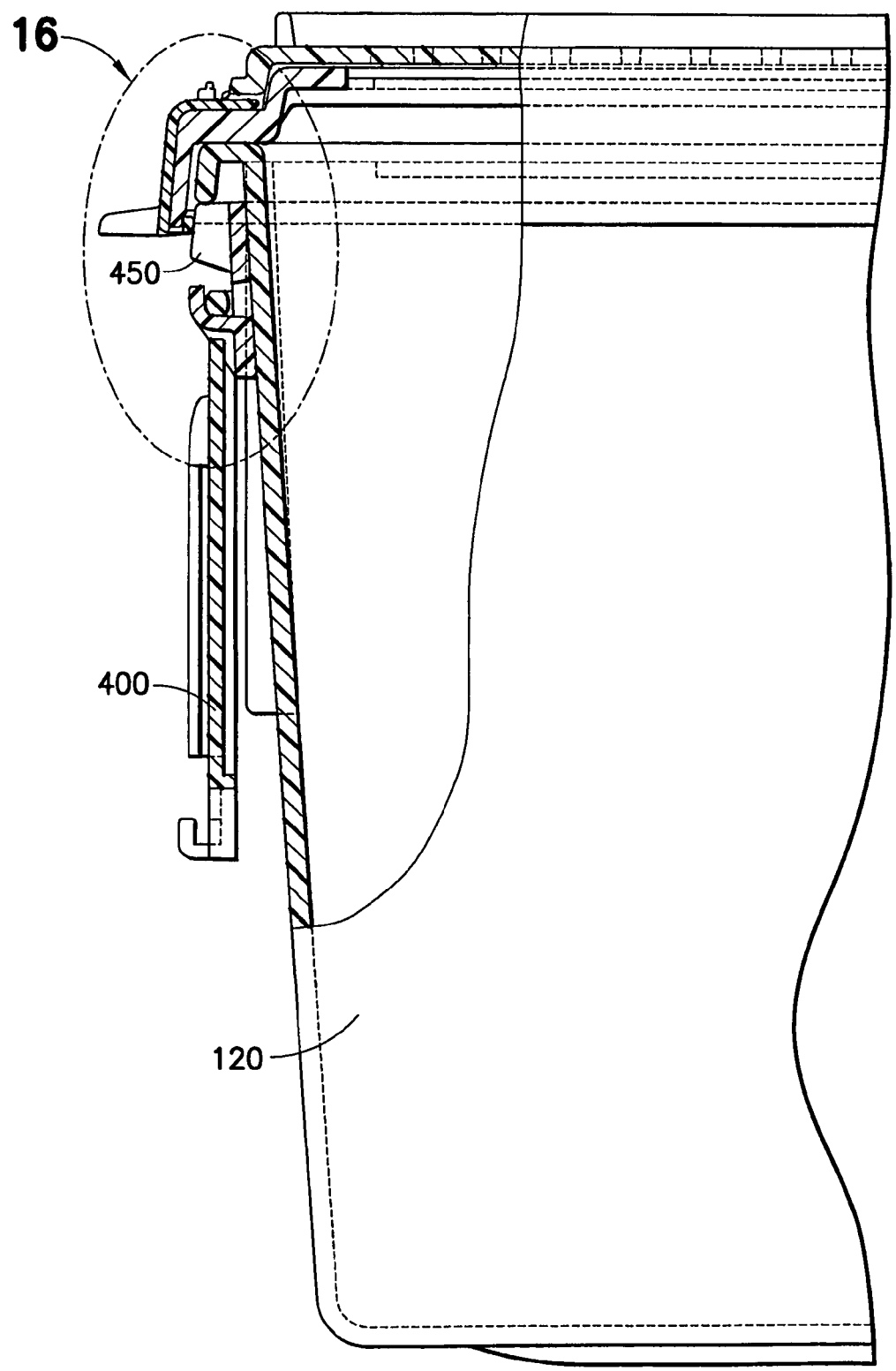
FIG. 15 is a side elevational view of the cage, card holder and retention member of FIG. 14.
Figure 16:
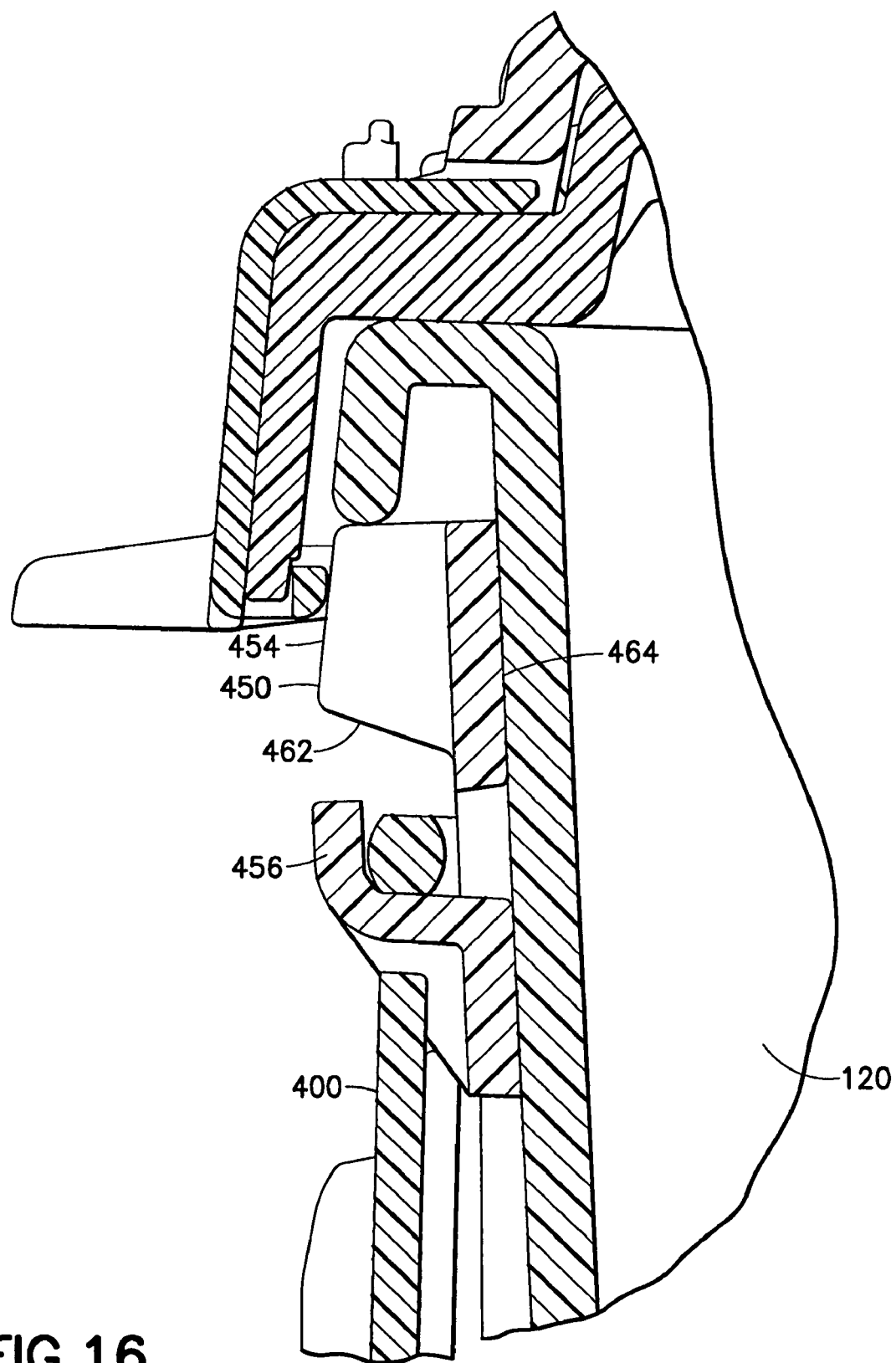
FIG. 16 is an enlarged view of section 16 of the cage, card holder and retention member of FIG. 15.

Further views of card holder 400 being retained by retention member 450 on cage 120 are shown in FIGS. 14 and 15. FIG. 16 illustrates an enlarged view of section 16 of FIG. 15.

Figure 17:
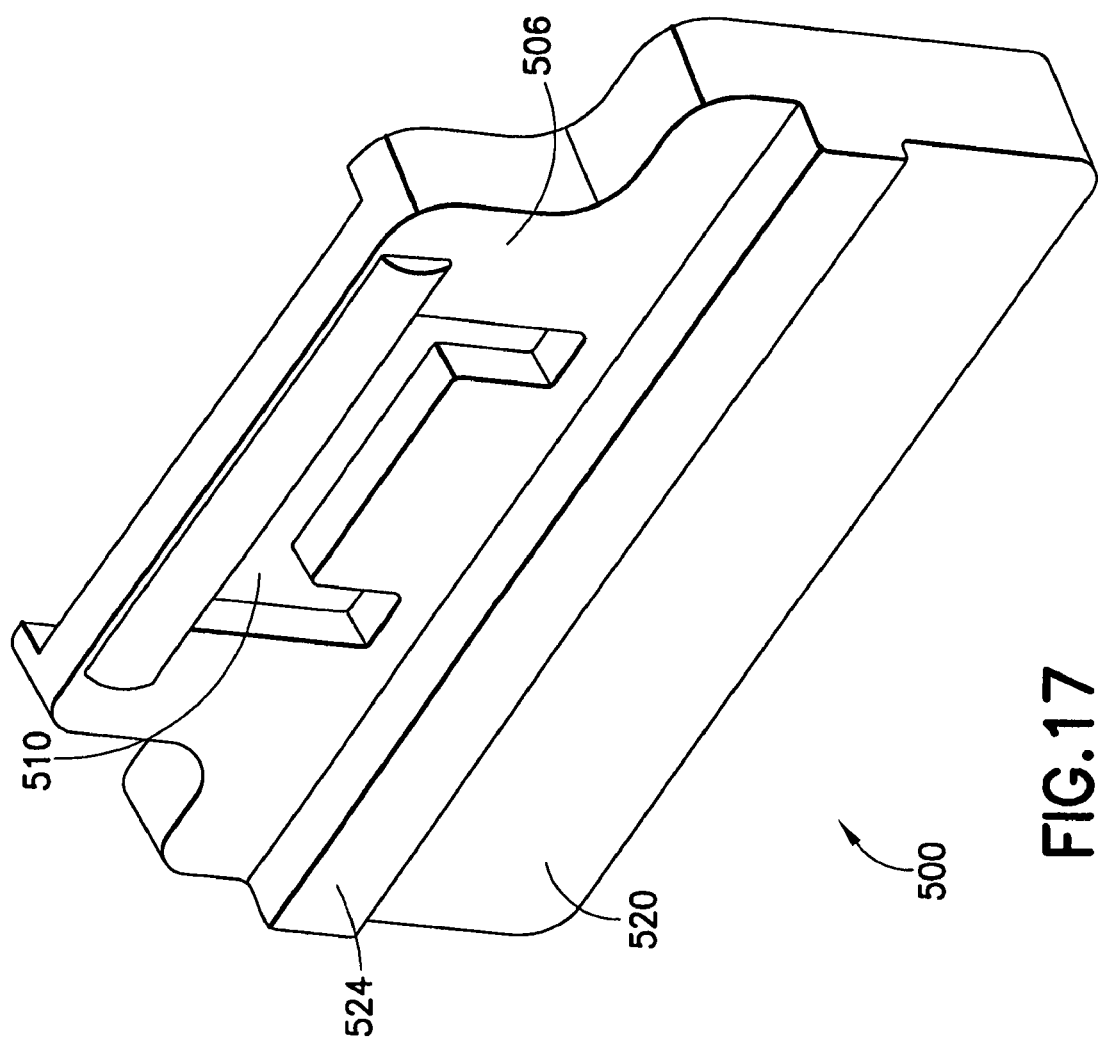
FIG. 17 is a perspective view of an adapter member in accordance with the invention.
Figure 18:
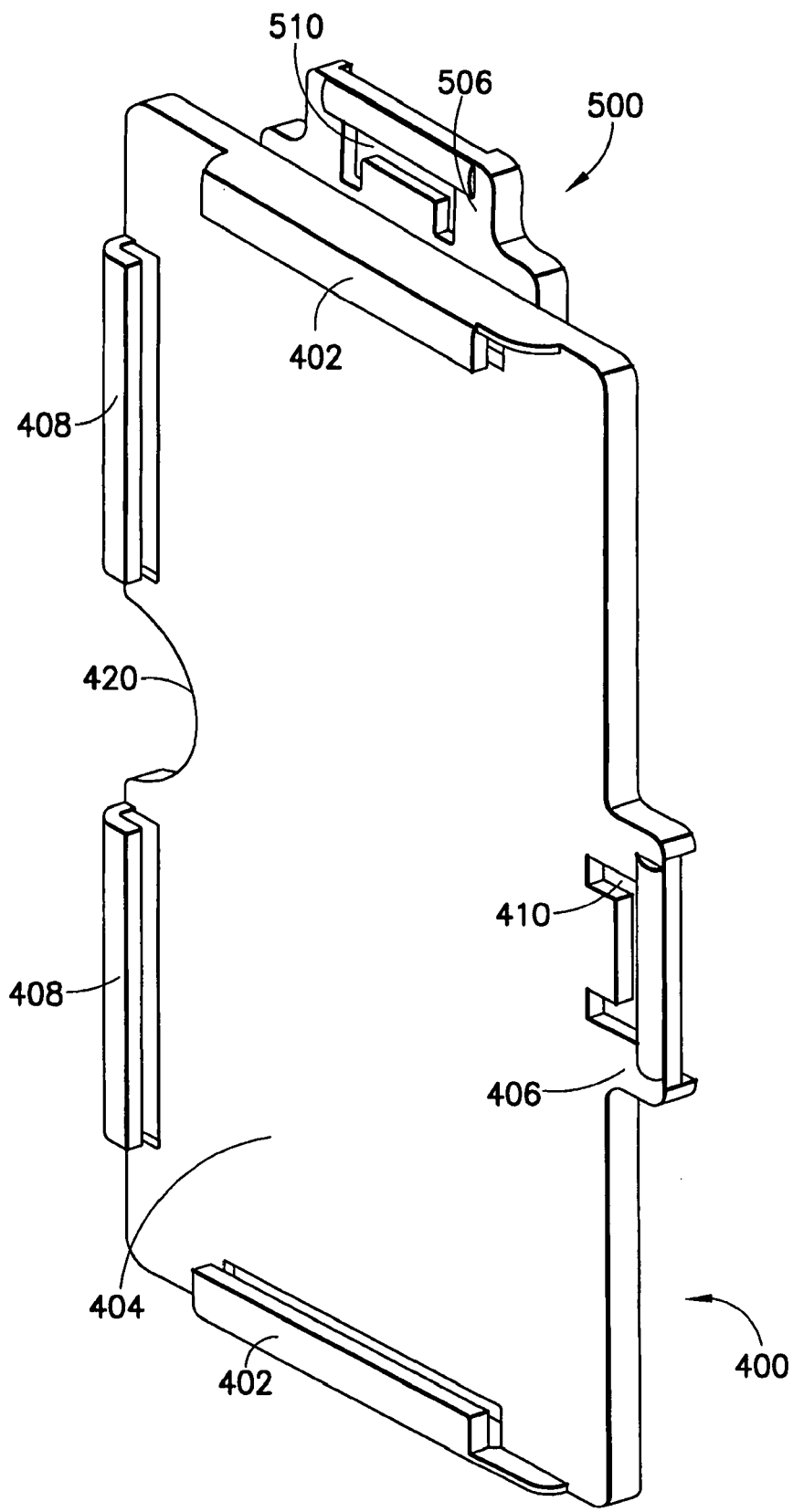
FIG. 18 is a perspective view of the adapter member of FIG. 17 coupled to the card holder of FIG. 12.

With reference to FIGS. 17 and 18, there is shown an adapter member 500. Adapter member 500 can be coupled to card holder 400 so that card holder 400 is oriented with bottom guides 408 positioned at the side and side guides 402 positioned at top and bottom locations. Adapter member 500 comprises a substantially flat mounting face 520 with a longitudinal protrusion 524 extending outwardly therefrom. Adapter member 500 further comprises a securing portion 506 having an aperture 510 being substantially similar in dimension to securing portion 406 and aperture 410, respectively, of card holder 400.

Figure 19:
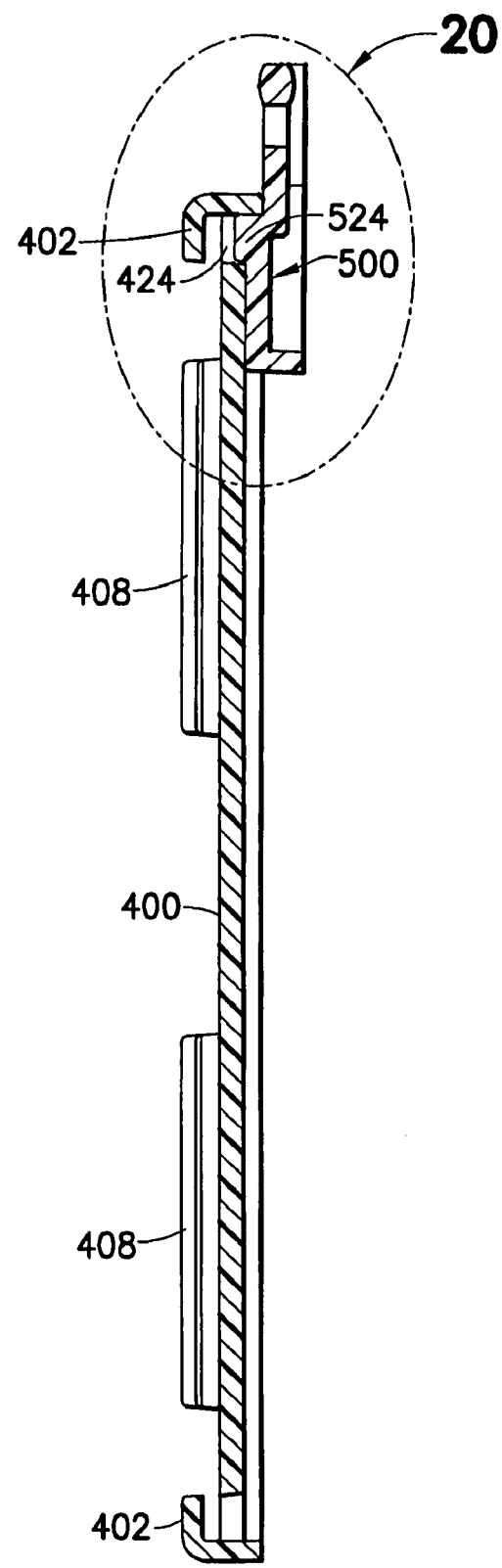
FIG. 19 is a side cross-sectional view of the adapter member and card holder of FIG. 18.
Figure 20:
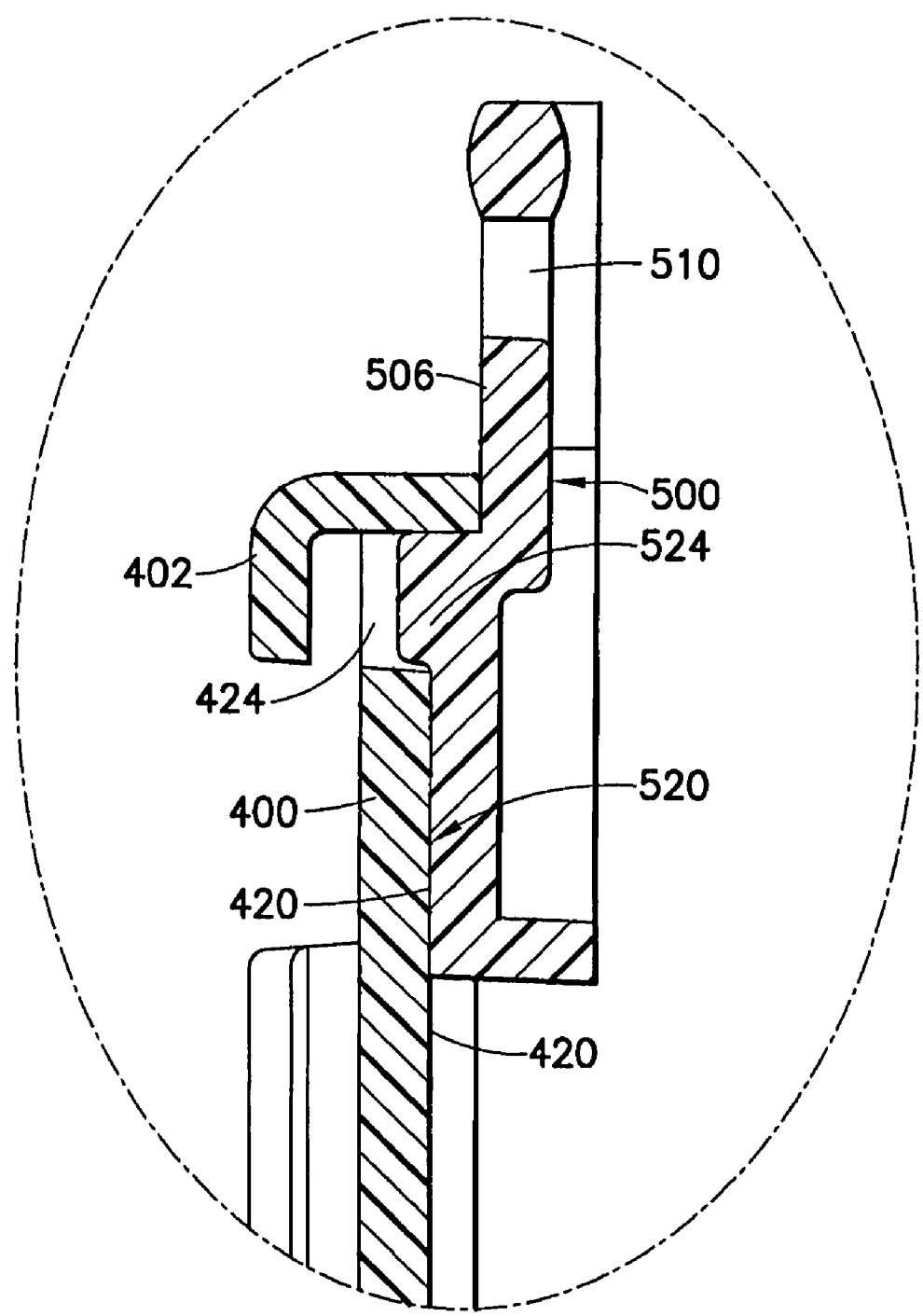
FIG. 20 is an enlarged view of section 20 of the adapter member and card holder of FIG. 19.

As illustrated by FIGS. 19 and 20, adapter member 500 can be coupled or attached to card holder 400, thus providing a securing portion 506 by which card holder 400 may be retained from retention member 450 on cage 120 from a region proximate a side guide 402 of card holder 400. Accordingly, by way of adapter member 500 coupled with card holder 400, the card holder 400 may be selectively positioned in one of a first orientation and a second orientation, the second orientation being substantially rotated ninety-degrees from the first position. By orienting the card in a narrow width-wise orientation (three-inch part on top, five-inch part on the side), more viewing space into the cage may be available as less of the width of the side of the cage is obscured by the card holder. With reference to FIG. 20, longitudinal protrusion 524 can be positioned to extend into slot 424 of card holder 400 to facilitate proper positioning of adapter member 500 on card holder 400. In certain embodiments, an adhesive tape or other suitable adhesive as is known by those skilled in the art can be placed between the mounting surface 520 of adapter member 500 and rear surface 420 of card holder 400 to facilitate the coupling of adapter member 500 to card holder 400.

Accordingly, embodiments of the present invention provide for a card holder that is light weight, relatively inexpensive to manufacture, has relative mechanical simplicity, and may be transparent or translucent thus affording improved views of animals. Additionally, embodiments of the invention may facilitate orienting card holder 300, 400 in a substantially horizontal orientation such that the cage 120 may be viewed even when a card is in card holder 300, 400. Additionally, because card holder 300, 400 is retained by retention member 350, 450 on the cage 120, it is thus less likely that it would be accidentally misplaced during maintenance and moving of the filter top 124.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

Moreover, while, in certain embodiments, for reasons of clarity and simplicity, portions of the invention have been described by way of the use of terms such as, for example, top, bottom, upper, lower, front, back and side, it is to be understood that the use of such terms should not be interpreted to limit the particular orientations or implementations of the described invention. It of course would be understood by one skilled in the art, for example, that a feature described as being a top, could in certain circumstances, be characterized as a bottom, depending on the relative orientations of the viewer and the viewed feature.

Further, while embodiments of the invention have been described as being formed of plastic, other suitable materials, as known by those skilled in the art, could be also be used. Also, different components of the invention could all be formed of the same material, or alternatively, could each be formed of different materials.

In addition, while the invention has been described as being used in conjunction with three-inch by five-inch index cards, larger or smaller cards, or other paper, plastic or other material could be used with the invention. With respect to larger or smaller cards, the relative size of the components could be modified in accordance with the size of card to be used.

It is also to be understood that the following claims are intended to cover all of the generic and specific features of the invention herein described and all statements of the scope of the invention which, as a matter of language, might be said to fall therebetween.

What is claimed is:

1. A card holder system for retaining a card with an animal cage, the system comprising:
   a card holder designed and dimensioned to selectively retain the card;
   a retention member adapted for retaining the card holder to the cage; and
   an adapter member designed and dimensioned to be coupled with the card holder; the card holder being pivotally associated with the adapter member, wherein the adapter member allows the card holder to be selectively positioned at least in a horizontal orientation and at least a vertical orientation, wherein the horizontal orientation is rotated substantially ninety-degrees from the vertical orientation.

2. The card holder system of claim 1, wherein the retention member is adapted to be secured to a side wall of the cage.

3. The card holder system of claim 2, wherein the retention member is adapted to be secured via an adhesive.

4. The card holder system of claim 1, the card holder having a card removal recess defined in a backplate of the card holder.

5. The card holder system of claim 1, the card holder comprising a securing portion having an aperture defined therein, the retention member having a hook portion, wherein the selective retention of the card holder is facilitated by the interaction of the securing portion and the hook portion.

6. The card holder of claim 1, wherein the retention member comprises an abutment wall, the abutment wall facilitating the retention of the holder on the retention member when the card holder is bumped by a user.

7. The card holder system of claim 1, wherein the card holder is formed of a plastic.

8. The card holder system of claim 7, wherein the card holder is formed of a translucent plastic.

9. The card holder system of claim 1, wherein the retention member is integrally formed as a portion of the sidewall of the cage.

10. The card holder system of claim 1, wherein the adapter member is integrally formed as a portion of the card holder.

11. The card holder system of claim 1, the card holder having a slot defined therein, the adapter member including a protrusion, wherein the protrusion is at least partially disposed within the slot when the adapter member is coupled to the card holder.

12. The card holder system of claim 1, wherein at the vertical orientation, the card holder is positioned substantially parallel to the retaining member, and at the horizontal orientation, the card holder is positioned substantially perpendicular to the retaining member.

13. A card holder system for retaining a card with an animal cage, the system comprising:
   a card holder designed and dimensioned to selectively retain the card, the card holder comprising one or more side guides and one or more bottom guides adapted to facilitate the positioning of the card at the card holder;
   a retention member adapted for retaining the card holder to the cage; and
   an adapter member designed and dimensioned to be coupled with the card holder such that the card holder is pivotally associated with the adapter member, wherein the adapter member is constructed and arranged to retain the card holder in a first orientation and at least one alternate orientation.

14. A card holder system for retaining a card with an animal cage, the system comprising:

a card holder designed and dimensioned to selectively retain the card;

a retention member adapted for retaining the card holder to the cage; and an adapter member designed and dimensioned to be coupled with the card holder, the card holder being pivotably associated with the adapter member such that the card holder may be selectively positioned in a first orientation and at least one alternate orientation, wherein the adapter member is adapted to be secured to the card holder via an adhesive.

15. A card holder system for retaining a card with an animal cage, the system comprising:

a cage having a filter top and a cage bottom;

a card holder designed and dimensioned to selectively retain the card;

a retention member adapted for retaining the card holder to the cage; and an adapter member designed and dimensioned to be coupled with the card holder such that the card holder may be selectively positioned in a first orientation and at least one alternate orientation, wherein the filter top may be removed from the cage bottom without removing the card holder from the retention member.

16. A card holder for retaining a card with an animal cage, the card holder being designed for use with a retention member adapted to be secured to the side wall of the cage, the card holder comprising one or more side guides and one or more bottom guides adapted to facilitate the positioning of the card at the card holder to selectively retain the card and to be retained to the animal cage by the retention member; wherein the card holder comprises an adapter member designed and dimensioned to be coupled with the card holder such that the card holder is pivotally associated with the adapter member and the adapter member allows the card holder to be selectively positioned in a first orientation and at least one alternate orientation, wherein the at least one alternate orientation comprises the first position rotated substantially ninety-degrees.

17. The card holder of claim 16, the card holder having a card removal recess defined in a backplate of the card holder.

18. The card holder of claim 16, wherein the card holder can be selectively retained in one of a horizontal orientation and a vertical orientation.

19. The card holder of claim 18, the card holder comprising a securing portion having an aperture defined therein, the retention member including a hook portion, wherein the selective retention of the card holder is facilitated by the interaction of the securing portion and the hook portion.

20. The card holder of claim 16, wherein the card holder is formed of a plastic.

21. The card holder system of claim 16, wherein the card holder is formed of a translucent plastic.

22. The card holder of claim 16, wherein the adapter member is adapted to be secured to the card holder via an adhesive.

23. The card holder of claim 16, wherein the adapter member is integrally formed as a portion of the card holder.

24. The card holder of claim 16, the card holder having a slot defined therein, the adapter member including a protrusion, wherein the protrusion is at least partially disposed within the slot when the adapter member is coupled to the card holder.

25. The card holder of claim 16, the cage having a filter top positioned on top of the cage, wherein the filter top may be removed from the cage without removing the card holder from the retention member.

* * * * *